(12) United States Patent
Ahn et al.

(10) Patent No.: US 10,810,800 B2
(45) Date of Patent: Oct. 20, 2020

(54) APPARATUS AND METHOD FOR PROVIDING VIRTUAL REALITY CONTENT OF MOVING MEANS

(71) Applicant: Korea Electronics Technology Institute, Seongnam-si, Gyeonggi-do (KR)

(72) Inventors: Yang Keun Ahn, Seoul (KR); Young Choong Park, Goyang-si (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 69 days.

(21) Appl. No.: 16/110,453

(22) Filed: Aug. 23, 2018

(65) Prior Publication Data

US 2019/0147654 A1    May 16, 2019

(30) Foreign Application Priority Data

Nov. 10, 2017   (KR) .......................... 10-2017-0149524

(51) Int. Cl.
*G06T 19/00* (2011.01)
*G06F 3/01* (2006.01)
*G06F 3/14* (2006.01)
*G06F 3/147* (2006.01)
*G05D 1/02* (2020.01)

(52) U.S. Cl.
CPC ............ *G06T 19/006* (2013.01); *G06F 3/013* (2013.01); *G06F 3/017* (2013.01); *G06F 3/147* (2013.01); *G06F 3/1446* (2013.01); *G05D 1/021* (2013.01)

(58) Field of Classification Search
CPC ..... G06T 19/006; G06F 3/013; G06F 3/1446; G06F 3/017; G06F 3/147; G05D 1/021
See application file for complete search history.

(56) References Cited

U.S. PATENT DOCUMENTS 9,420,392 B2 *   8/2016   Kuehne .................... H04S 7/304
9,626,802 B2 *   4/2017   Poulos ..................... G06F 3/012
(Continued)

FOREIGN PATENT DOCUMENTS

KR      10-2014-0071086 A      6/2014
KR         20170082394 A       7/2017
(Continued)

OTHER PUBLICATIONS

Korean Office Action dated Dec. 17, 2018, issued in corresponding Korean Patent Application No. 10-2017-0149524, citing the above references.

*Primary Examiner* — Amy Onyekaba
(74) *Attorney, Agent, or Firm* — Hauptman Ham, LLP

(57) ABSTRACT

Provided is an apparatus for providing virtual reality content of a moving means, the apparatus including a plurality of transparent display units mounted on front and side surfaces of the moving means and configured to display virtual reality content, a dynamic motion sensing unit configured to detect a three-dimensional (3D) dynamic motion of the moving means, and a control unit configured to control reproduction of previously stored virtual reality content so as to display virtual reality content corresponding to the 3D dynamic motion on the plurality of transparent display units, when the 3D dynamic motion of the moving means is detected by the dynamic motion sensing unit.

10 Claims, 4 Drawing Sheets

(56) References Cited

U.S. PATENT DOCUMENTS

| | | |
|---|---|---|
| 9,754,414 B2 | 9/2017 | Kim et al. |
| 10,037,699 B1* | 7/2018 | Toyoda ............... G06K 9/00805 |
| 2007/0229397 A1* | 10/2007 | Sefton ................. A63B 71/0622 |
| | | 345/8 |
| 2012/0050141 A1* | 3/2012 | Border .................. G02B 27/01 |
| | | 345/8 |
| 2012/0224060 A1* | 9/2012 | Gurevich ................ B60R 1/00 |
| | | 348/148 |
| 2014/0063064 A1* | 3/2014 | Seo ..................... G01C 21/365 |
| | | 345/633 |
| 2014/0104274 A1* | 4/2014 | Hilliges ................. G06F 30/20 |
| | | 345/424 |
| 2014/0152698 A1* | 6/2014 | Kim .................... G06F 3/04815 |
| | | 345/633 |
| 2014/0168265 A1* | 6/2014 | Ahn ........................ B60R 1/00 |
| | | 345/633 |
| 2014/0368539 A1* | 12/2014 | Yeh .................... G02B 27/017 |
| | | 345/633 |
| 2015/0309316 A1* | 10/2015 | Osterhout ............. G06F 3/0346 |
| | | 345/8 |
| 2015/0316985 A1* | 11/2015 | Levesque ................ G06F 3/016 |
| | | 345/156 |
| 2015/0325027 A1* | 11/2015 | Herman ................ A63F 13/428 |
| | | 345/633 |
| 2017/0113626 A1* | 4/2017 | Nakajima ........... B60R 11/0229 |
| 2017/0267099 A1* | 9/2017 | Yerli ...................... B60K 35/00 |
| 2017/0272838 A1* | 9/2017 | Glazer ............. H04N 21/44218 |
| 2017/0287225 A1* | 10/2017 | Powderly ............. G06T 19/006 |
| 2018/0039341 A1* | 2/2018 | Du Bois ................ A61K 38/17 |
| 2018/0246326 A1* | 8/2018 | Moon ................ G02B 27/0172 |
| 2018/0293041 A1* | 10/2018 | Harviainen .......... H04N 13/361 |
| 2018/0366091 A1* | 12/2018 | Han ........................ G06F 3/017 |
| 2019/0009175 A1* | 1/2019 | Buxton ................. A63F 13/803 |
| 2019/0019413 A1* | 1/2019 | Yun ................. B60W 30/18163 |
| 2019/0101976 A1* | 4/2019 | Reichow ............. B60W 50/14 |
| 2019/0129384 A1* | 5/2019 | Cherney ................ G06F 3/017 |
| 2019/0315275 A1* | 10/2019 | Kim ..................... B60W 40/02 |
| 2019/0333380 A1* | 10/2019 | Kobayashi ........... G08G 1/0129 |
| 2019/0361435 A1* | 11/2019 | Kawaguchi .......... G05D 1/0016 |

FOREIGN PATENT DOCUMENTS

| | | |
|---|---|---|
| KR | 10-2017-0092009 A | 8/2017 |
| KR | 20170092009 * | 8/2017 |
| WO | 2017/034667 A1 | 3/2017 |

\* cited by examiner

APPARATUS AND METHOD FOR PROVIDING VIRTUAL REALITY CONTENT OF MOVING MEANS

CROSS-REFERENCE TO RELATED APPLICATION

This application claims priority to and the benefit of Korean Patent Application No. 10-2017-0149524, filed on Nov. 10, 2017, the disclosure of which is incorporated herein by reference in its entirety.

BACKGROUND

1. Field of the Disclosure

The present disclosure relates to an apparatus and method for providing virtual reality content of a moving means, and more specifically, to an apparatus and method for detecting a three-dimensional (3D) dynamic motion of a moving means and providing virtual reality content corresponding to the 3D dynamic motion.

2. Discussion of Related Art

Generally, a fixed type virtual reality system provides a virtual reality content motion directly according to a scenario of virtual reality content without sensing a user's motion. The fixed type virtual reality system is not actually applied to the road or a space and thus is limited in terms of generation of a motion.

In addition, the fixed type virtual reality system is inconvenient to use, since it can be used only when a user puts a head-mounted electronic device on his or her head.

SUMMARY OF THE DISCLOSURE

To address the problems of the related art, the present disclosure is directed to an apparatus and method for providing virtual reality content of a moving means, which are capable of detecting three-dimensional (3D) dynamic motions of a passenger who gets on the moving means movable through autonomous driving and the moving means and controlling virtual reality content displayed on a large-scale transparent display on the basis of the 3D dynamic motions, thereby implementing virtual reality in a space of the moving means without inconvenience caused when wearing a device to experience the virtual reality and without limitation of a motion.

The present disclosure is not limited thereto, and other aspects which are not mentioned herein will be clearly understood by those of ordinary skill in the art from the following description.

According to an aspect of the present disclosure, an apparatus for providing virtual reality content of a moving means includes a plurality of transparent display units configured to display virtual reality content, the plurality of transparent display units being mounted on front and side surfaces of the moving means; a dynamic motion sensing unit configured to detect a three-dimensional (3D) dynamic motion of the moving means; and a control unit configured to control reproduction of previously stored virtual reality content so as to display virtual reality content corresponding to the 3D dynamic motion detected by the dynamic motion sensing unit on the plurality of transparent display units.

According to another aspect of the present disclosure, a method of providing virtual reality content of a moving means includes detecting a 3D dynamic motion of the moving means by a dynamic motion sensing unit; and controlling reproduction of virtual reality content displayed on a transparent display unit to correspond to the detected 3D dynamic motion of the moving means, the controlling of the reproduction of the virtual reality content being performed by a control unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The advantages and features of the present disclosure and methods of achieving them will be apparent from embodiments described below in detail in conjunction with the accompanying drawings. The present disclosure is not, however, limited to the embodiments set forth herein and may be embodied in many different forms. Rather, these embodiments are provided so that this disclosure will be thorough and complete and will fully convey the concept of the present disclosure to those of ordinary skill in the art. The scope of the present disclosure should be defined by the appended claims. The terminology used herein is provided to explain the embodiments and are not intended to restrict the scope of the present disclosure. As used herein, the singular forms "a," "an," and "the" are intended to include the plural forms as well, unless the context clearly indicates otherwise. It will be understood that the terms "comprise" and/or "comprising," when used herein, specify the presence of stated components, steps, operations, and/or elements, but do not preclude the presence or addition of one or more other components, steps, operations, and/or elements.

Figure 1:
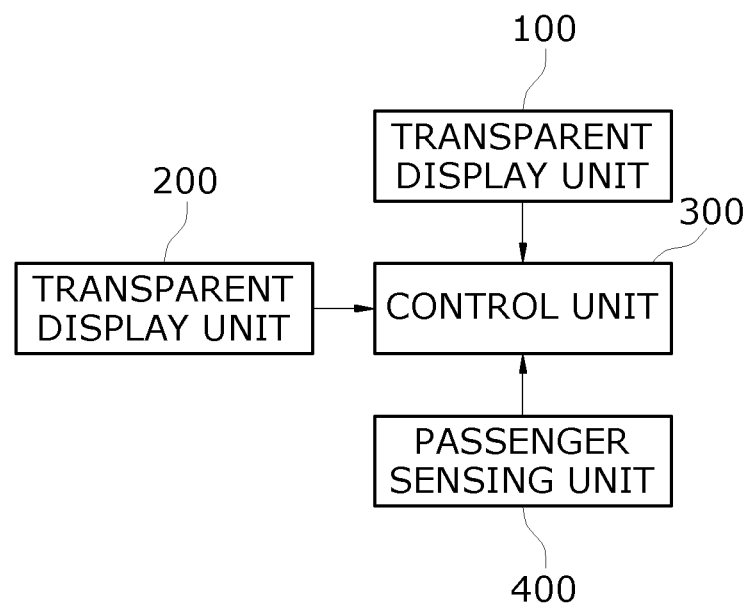
FIG. 1 is a block diagram of an apparatus for providing virtual reality content of a moving means, according to an embodiment of the present disclosure.
Figure 2:
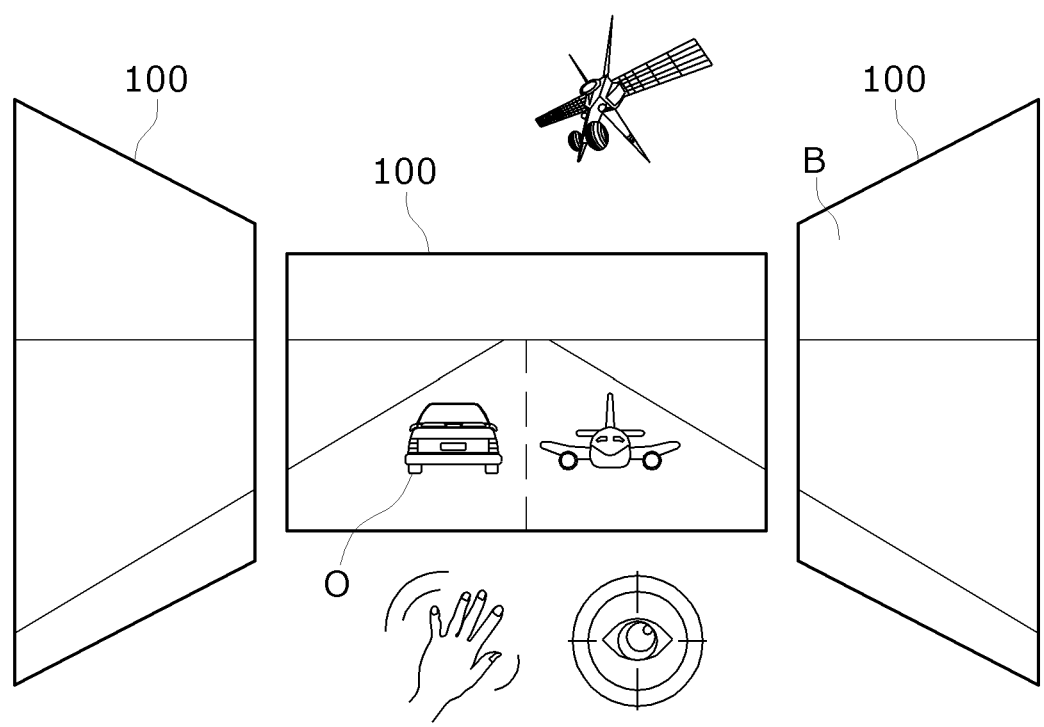
FIG. 2 is a reference diagram for explaining an apparatus for providing virtual reality content of a moving means according to an embodiment of the present disclosure.

FIG. 1 is a block diagram of an apparatus for providing virtual reality content of a moving means, according to an embodiment of the present disclosure. FIG. 2 is a reference diagram for explaining an apparatus for providing virtual reality content of a moving means according to an embodiment of the present disclosure. As illustrated in FIG. 1, the apparatus for providing virtual reality content of a moving means according to an embodiment of the present disclosure includes a transparent display unit 100, a dynamic motion sensing unit 200, and a control unit 300.

The transparent display unit 100 includes a plurality of transparent display devices and is mounted on front and side surfaces of a moving means to display virtual reality content.

The dynamic motion sensing unit 200 detects a three-dimensional (3D) dynamic motion of the moving means. The dynamic motion sensing unit 200 may include various types of sensors. For example, sensors, such as a 3D acceleration sensor, a speed sensor, a vibration sensor, and an impact sensor, may be operated in connection with each other or be operated independently.

When a 3D dynamic motion of the moving means is detected by the dynamic motion sensing unit 200, the control unit 300 controls the transparent display unit 100 to display virtual reality content corresponding to the detected 3D dynamic motion on the transparent display unit 100. In this case, the control unit 300 may store the virtual reality content in a storage unit linked thereto, and manage the virtual reality content.

Thus, when the dynamic motion sensing unit 200 detects the 3D dynamic motion of the moving means, the control unit 300 displays the virtual reality content on the transparent display unit 100 as illustrated in FIG. 2. In this case, the virtual reality content displayed on the transparent display unit 100 may include a background B and an object O.

According to an embodiment of the present disclosure, a 3D dynamic motion of an autonomous moving means which a passenger gets on may be detected and virtual reality content corresponding to the detected 3D dynamic motion may be displayed on a transparent display unit mounted in the moving means. Accordingly, any inconvenience caused when the passenger wears a device to experience virtual reality may be removed and virtual reality may be provided in a space of the moving means without limitation of motions.

Figure 3:
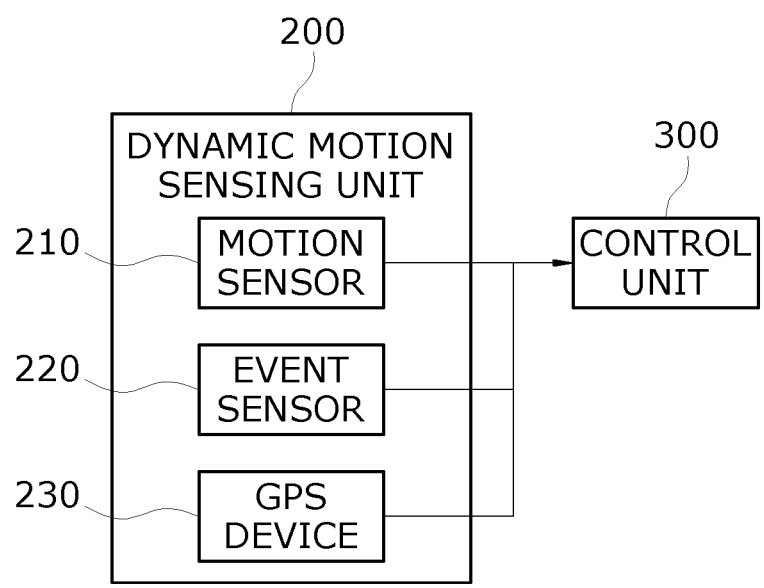
FIG. 3 is a block diagram of a dynamic motion sensing unit according to an embodiment of the present disclosure.

FIG. 3 is a block diagram of a dynamic motion sensing unit according to an embodiment of the present disclosure.

As illustrated in FIG. 3, the dynamic motion sensing unit 200 according to an embodiment of the present disclosure may sense a moving means to control a background, an object, etc. of virtual reality content. In an embodiment of the present disclosure, the background of the virtual reality content may be previously stored background information to be provided as the moving means is moving along a driving path.

Thus, in order to control the background of the virtual reality content, the dynamic motion sensing unit 200 includes a motion sensor 210 configured to sense a 3D dynamic motion, such as three-axis acceleration, speed, orientation, etc., of the moving means.

For example, when the moving means is moving, the dynamic motion sensing unit 200 senses the speed of the moving means through the motion sensor 210. Then, the control unit 300 displays virtual reality content corresponding to the speed of the moving means on the transparent display unit 100. When the speed of the moving means is increased, the dynamic motion sensing unit 200 senses the speed and acceleration of the moving means. Thus, the control unit 300 may increase playback speed of the virtual reality content displayed on the transparent display unit 100 according to the speed and acceleration of the moving means, so that virtual reality may be experienced inside the moving means.

In order to control the object of the virtual reality content, the dynamic motion sensing unit 200 includes an event sensor 220 configured to sense a motion of an event, e.g., a vibration, an impact, or the like, occurring in the moving means. For example, when the moving means passes a speed bump on the road or the like, a vibration or an impact may occur in the moving means due to the speed bump. The event sensor 220 of the dynamic motion sensing unit 200 senses the vibration or the impact occurring in the moving means, and the control unit 300 controls the object included in the virtual reality content to be displayed on the transparent display unit 100.

According to an embodiment of the present disclosure, the object may be content to be provided independently from the background.

In order to sense location information of the moving means, the dynamic motion sensing unit 200 may further include a global positioning system (GPS) device 230 configured to sense the latitude, longitude, and altitude of the moving means. Thus, the control unit 300 may control the background of the virtual reality content according to the location information of the moving means detected by the GPS device 230.

Figure 4:
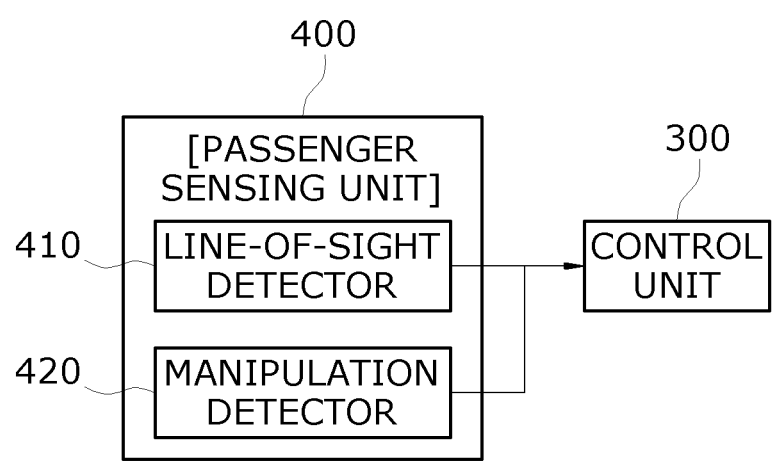
FIG. 4 is a block diagram of a passenger sensing unit according to an embodiment of the present disclosure.

FIG. 4 is a block diagram of a passenger sensing unit according to an embodiment of the present disclosure.

According to an embodiment of the present disclosure, the apparatus of FIG. 1 may further include a passenger sensing unit 400 having a line-of-sight detector 410 and a manipulation detector 420 as illustrated in FIG. 4.

The line-of-sight detector 410 detects a passenger's line of sight to target a content object.

The manipulation detector 420 detects the passenger's gesture for removing the content object targeted by the line-of-sight detector 410.

In this case, the control unit 300 controls the line-of-sight detector 410 to target the content object, and controls the manipulation detector 420 to remove the targeted content object.

As described above, according to an embodiment of the present disclosure, a line of sight and gesture of a passenger located inside a moving means may be detected, as well as detection of a 3D dynamic motion of the moving means according to the embodiment. Accordingly, not only background content but also a virtual reality shooting game may be provided inside the moving means via a transparent display unit.

Figure 5:
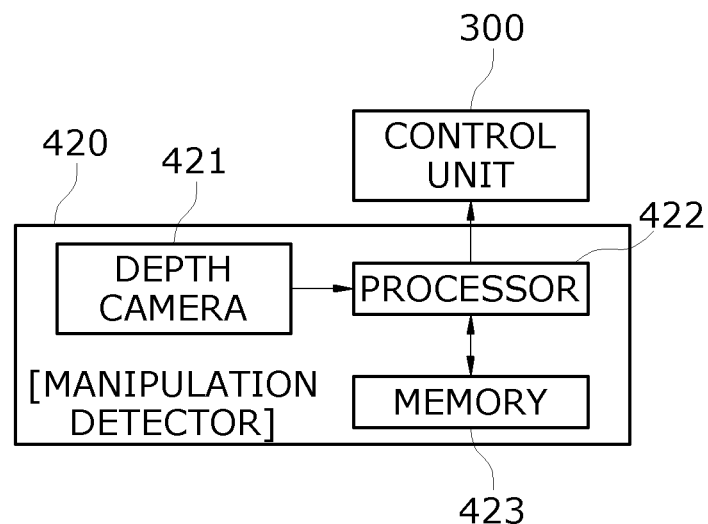
FIG. 5 is a block diagram of a manipulation detector according to an embodiment of the present disclosure.

FIG. 5 is a block diagram of a manipulation detector according to an embodiment of the present disclosure.

The manipulation detector 420 according to an embodiment of the present disclosure may include a depth camera 421, a memory 710 and a processor 720 as illustrated in FIG. 5.

The depth camera 421 is configured to capture a depth image. The depth image includes a virtual space touch screen and a passenger's object. In this case, the passenger's object may be his or her body, e.g., a hand, or another object but the present disclosure is not limited thereto. The depth image may be captured by the depth camera 421 but may be captured or generated using various methods, e.g., may be generated by stereo matching between reference images captured from various viewpoints.

The memory 710 store a program identifying a navigation gesture of the passenger's object. The memory 710 should be understood to include a nonvolatile memory device capable of retaining information stored therein even when power is not supplied thereto, and a volatile memory device. For example, the memory 710 may include a NAND flash memory such as a compact flash (CF) card, a security digital (SD) card, a memory stick, a solid-state drive (SSD), and a micro SD card, a magnetic computer storage device such as a hard disk drive (HDD), an optical disc drive such as a compact disc (CD)-read-only memory (ROM), and a digital versatile disc (DVD)-ROM, etc.

The navigation gesture (hereinafter referred to as the 'gesture') refers to an operation of controlling an object included in content, e.g., a command such as up/down/left/right.

The processor 720 receives the depth image captured by the depth camera 421 when the program stored in the memory 710 is executed, and generates a virtual space touch screen from the depth image.

Furthermore, the processor 720 detects a movement direction of a gesture of a passenger's object, which is included in the depth image, on the virtual space touch screen, and generates a control command according to the movement direction. Control commands may be stored in the memory 710 such that each of the control commands matches one of unique device functions, e.g., shooting, to be controlled.

The virtual space touch screen generated by the processor 720 and the detection of movement direction of the gesture of the passenger's object on the virtual space touch screen will be described in detail below.

FIG. 5 is a diagram for describing detection of movement direction of a gesture of the passenger's object.

The processor 720 may divide a physical surface of an object included in a depth image into a plurality of 3D points, and detect a movement direction of the object's gesture on the basis of whether the plurality of 3D points are located on a virtual space touch screen.

That is, the processor 720 detects a first point of the gesture of the object included in the depth image, and detects a second point of the gesture of the object moved from the first point in the direction of movement. In this case, the first and second points may include one or more 3D points.

The processor 720 may detect the movement direction of the object's gesture on the basis of location information of the detected first and second points on the virtual space touch screen.

In an embodiment of the present disclosure, a range A in which the virtual space touch screen is generated may be set.

The virtual space touch screen needs to be generated at an appropriate location when the relation between the depth camera 421 and the object is taken into account. To this end, in an embodiment of the present disclosure, the range A in which the virtual space touch screen is generated may be set by a user or may be set on the basis of a range of shooting performed by the depth camera 421.

Alternatively, the range A in which the virtual space touch screen is generated may be set on the basis of at least one of a maximum movement distance and an average movement distance of the object. Here, the maximum movement distance of the object refers to a maximum movement distance of the object in a vertical or horizontal direction. The average movement distance of the object refers to an average of movement distances of the object when moving a plurality of times in the vertical or horizontal direction. When the range A in which the virtual space touch screen is generated is determined using the average movement distance, the virtual space touch screen may be generated within a range optimized for the user's physical conditions, thereby providing a more accurate recognition rate.

In an embodiment of the present disclosure, the virtual space touch screen may be generated and divided into a first group region (n, n+1, . . . ) and a second group region (m, m+1, . . . ).

In this case, a plurality of regions included in each of the first group region and the second group region may be generated in parallel with each other, and the second group region may be generated in a direction perpendicular to the first group region.

The first group region and the second group region will be generated in detail as follows.

First, when the processor 720 detects a starting point of movement of the object included in the depth image on the virtual space touch screen, the processor 720 may set the detected starting point of the movement to be a region included in a first group region. Next, the processor 720 may generate regions which are in parallel to each other or which intersect each other at right angles with respect to the set region.

For example, a location at which a starting point of movement of the object's gesture is detected may be set as a first region n of a first group region (n, n+1). Next, the processor 720 may generate a second region (n+1) which is in parallel to and spaced a predetermined distance from the first region n of the first group region (n, n+1) within a region A in which the above-described virtual space touch screen is set, and may simultaneously or sequentially generate a first region m and a second region (m+1) of a second group region (m, m+1).

Accordingly, in an embodiment of the present disclosure, regions constituting the virtual space touch screen corresponding to a movement direction of the object's gesture in the region A in which the virtual space touch screen is set may be generated, thereby more increasing a rate of recognition of the object's gesture.

The first and second group regions may include only two-dimensional (2D) regions with the x-axis and the y-axis but may include 3D regions with the x-axis, the y-axis, and the z-axis. In this case, the ranges of the x-axis, the y-axis, and the z-axis may be set according to conditions of the above-described range A in which the virtual space touch screen is generated.

Alternatively, in the virtual space touch screen according to the embodiment of the present disclosure, each of a first group region (n, n+1, n+2) and a second group region (m, m+1, m+2) may include three or more regions.

Accordingly, the processor 720 may generate a control command corresponding to a movement direction and a movement distance by detecting not only movement directions in three or more parallel regions but also movement distances therein.

For example, when a first region (n=1) of a first group region is touched by an object and then a second region (n=2) of the first group region is touched by the object, a movement direction is a downward direction and the two regions are touched. Thus, the processor 720 may generate a control command to decrease volume of a device by one level.

In contrast, when the first region (n=1) is touched by the object and then not only the second region (n=2) but also a third region (n=3) are touched by the object within a predetermined time after the touching of the first region (n=1), the three regions are touched even in the same movement direction and thus the processor 720 may generate a control command to decrease the volume of the device by two levels or more.

As described above, in an embodiment of the present disclosure, a control command may be generated by reflecting not only a movement direction but also a movement distance on a virtual space touch screen, thereby conducting device control in simpler and various ways.

After the above-described virtual space touch screen is generated, the processor 720 detects a first point of a gesture of the object included in the depth image, and detects a second point of the gesture of the object moving from the first point in the movement direction. Thereafter, a movement direction of the gesture may be detected, based on whether the detected first and second points are located in a plurality of regions of the first or second group region.

For example, the processor 720 may determine the movement direction of the object to be a downward direction when it is detected that the first point is located on the first region n of the first group region (n, n+1) and the second point is located on the second region (n+1) of the first group region (n, n+1) after the first and second points are detected from the depth image.

Likewise, the processor 720 may determine the movement direction of the object to be an upward direction when it is detected that the first point is located on the second region (n+1) of the first group region (n, n+1) and the second point is located on the first region n of the first group region (n, n+1).

Alternatively, the processor 720 may determine the movement direction of the object to be a horizontal direction by detecting locations of the first and second points on the second group region (m, m+1).

In this case, the processor 720 may initialize the first and second points when it is detected that the second point is located at the same region as the first point among the plurality of regions included in the first or second group region.

The processor 720 may also initialize the detected first and second points when it is detected that the second point is neither located at the same region as the first point nor at a different region, e.g., when a user's gesture is extremely small and thus the second point is detected between the first and second regions of the first group region or beyond the range A in which the space touch screen is generated. In this case, no region may be included in the movement direction of the gesture.

As described above, in an embodiment of the present disclosure, not only a movement direction may be simply detected but also a wrong gesture may be identified, thereby guiding a user to make an appropriate gesture.

Components according to an embodiment of the present disclosure may be embodied by software or hardware such as a field programmable gate array (FPGA) or an application specific integrated circuit (ASIC), and may perform certain functions.

However, the components should be understood as not being limited to software or hardware, and each of the components may be included in an addressable storage medium or configured to reproduce one or more processors.

For example, the components include components, such as software components, object-oriented software components, class components, and task components, processes, functions, attributes, procedures, subroutines, segments of program code, drivers, firmware, microcode, circuits, data, database, data structures, tables, arrays, and variables.

The components and functions provided therein may be combined to a smaller number of components and a smaller number of functions or may be divided into sub-components and sub-functions.

Figure 6:
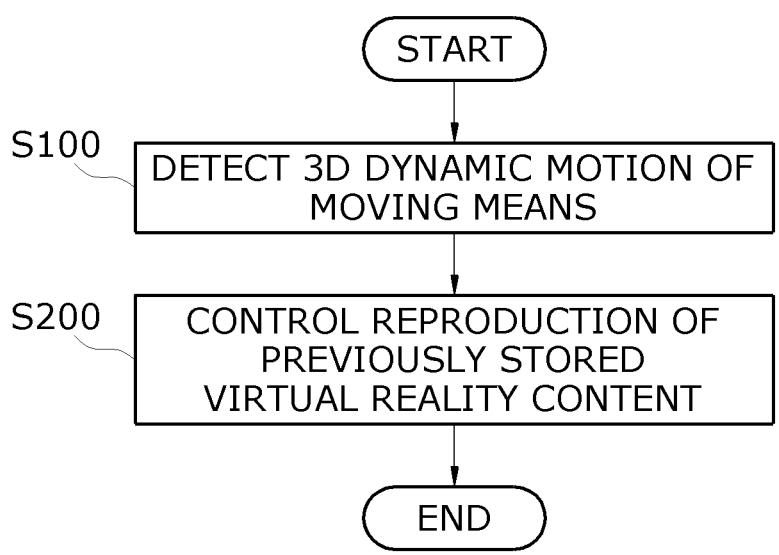
FIG. 6 is a flowchart of a method of providing virtual reality content of a moving means, according to an embodiment of the present disclosure.

A method of providing virtual reality content of a moving means according to an embodiment of the present disclosure will be described with reference to FIG. 6 below.

In the method of providing virtual reality content of a moving means according to an embodiment of the present disclosure, the transparent display unit 100 may be mounted on a window of the moving means and the dynamic motion sensing unit 200 may be mounted on the moving means.

The dynamic motion sensing unit 200 detects a 3D dynamic motion of the moving means (operation S100).

When the 3D dynamic motion of the moving means is detected by the dynamic motion sensing unit 200, the control unit 300 controls reproduction of previously stored virtual reality content to display virtual reality content corresponding to the detected 3D dynamic motion on the transparent display unit 100 (operation S200).

In the embodiment of the present disclosure, in operation S200 in which the reproduction of the virtual reality content is controlled, the detected 3D dynamic motion may include information regarding movement of the moving means such as acceleration, speed, and direction, and information regarding an event such as a vibration and an impact.

Accordingly, the controlling of the reproduction of the virtual reality content may include sensing a vibration, an impact, or the like applied to the moving means so that the control unit 300 may control a content object of the virtual reality content.

The controlling of the reproduction of the virtual reality content may include sensing the 3-axis acceleration, speed, direction, etc. of the moving means so that the control unit 300 may control a background of the virtual reality content.

The detecting of the 3D dynamic motion may include sensing latitude, longitude, and altitude of the moving means so that location information of the moving means may be sensed by the GPS device 230. The control of the reproduction of the virtual reality content may include controlling the background of the virtual reality content using the control unit 300 according to the location information of the moving means detected by the GPS device 230.

In contrast, the control unit 300 may control the line-of-sight detector 410 to target a content object and control the manipulation detector 420 to remove the targeted content object, when the line-of-sight detector 410 detects a passenger's line of sight to target the content object and the manipulation detector 420 detects the passenger's gesture for removing the content object targeted by the line-of-sight detector 410.

According to an embodiment of the present disclosure, 3D dynamic motions of a passenger and a moving means may be detected, and virtual reality content displayed on a large-scale transparent display may be controlled using the detected 3D dynamic motions. Accordingly, virtual reality may be implemented in a space of the moving means without inconvenience caused when a user wears a device to experience virtual reality and without limitation of motions.

An embodiment of the present invention may be implemented in a computer system, e.g., as a computer readable medium.

Figure 7:
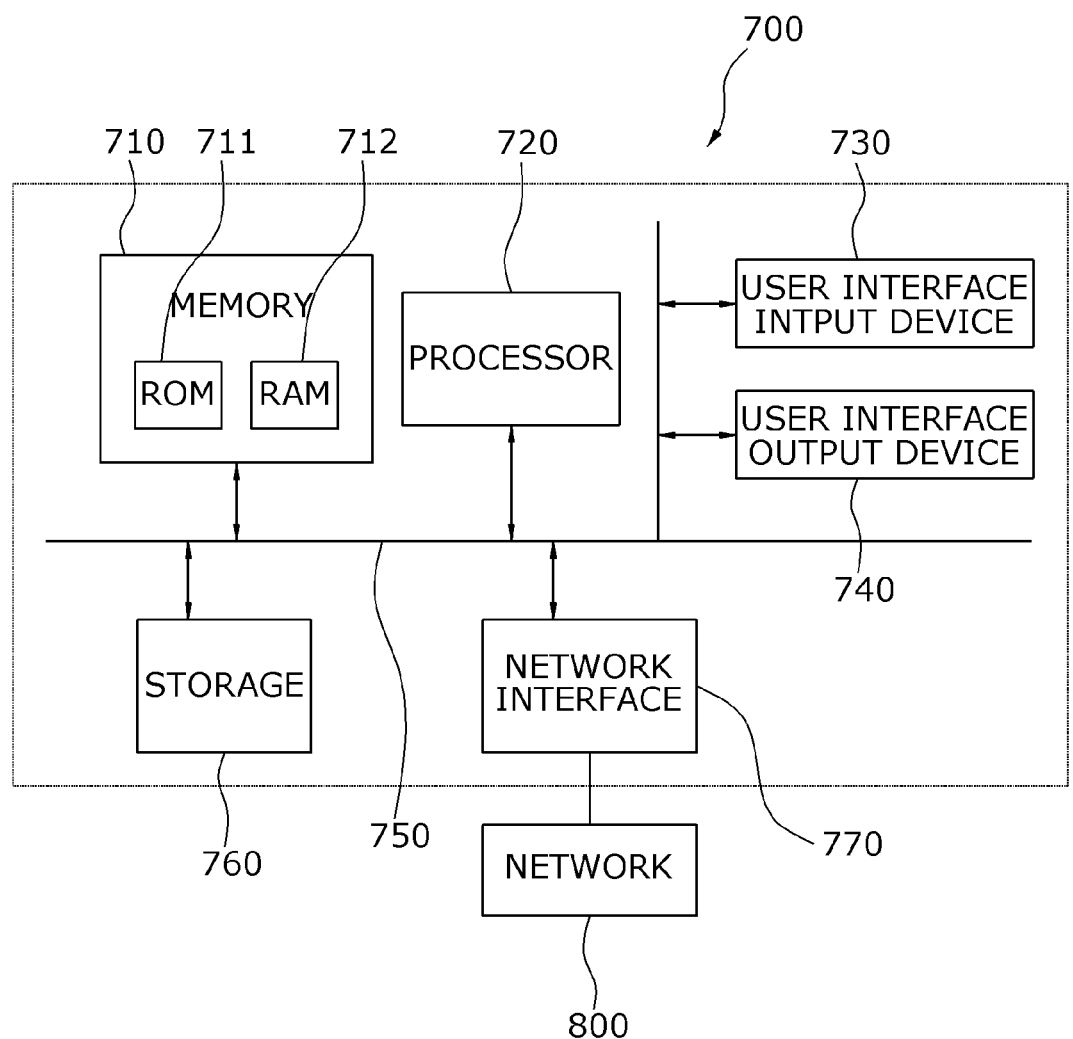
FIG. 7 is a block diagram illustrating a computer system to which the present invention is applied.

FIG. 7 is a block diagram illustrating a computer system to which the present invention is applied.

As shown in FIG. 7, a computer system 700 may include one or more of a processor 710, a memory 730, a user input device 740, a user output device 750, and a storage 760, each of which communicates through a bus 720. The computer system 700 may also include a network interface 770 that is coupled to a network 800. The processor 710 may be a central processing unit (CPU) or a semiconductor device that executes processing instruction stored in the memory 730 and/or the storage 760. The memory 730 and the storage 760 may include various forms of volatile or non-volatile storage media. For example, the memory 730 may include a read-only memory (ROM) 731 and a random access memory (RAM) 732.

Accordingly, an embodiment of the invention may be implemented as a computer implemented method or as a non-transitory computer readable medium with computer executable instruction stored thereon. In an embodiment, when executed by the processor, the computer readable instruction may perform a method according to at least one aspect of the invention.

While the present disclosure has been described above with reference to the accompanying drawings, the above description is merely an example and various modifications and changes may be made therein by those of ordinary skill in the art disclosure without departing from the spirit or scope of the disclosure. Accordingly, the scope of the present disclosure should not be construed as being limited to the above-described embodiments and should be defined by the appended claims.

What is claimed is:

1. An apparatus for providing virtual reality content of a moving means, comprising:
    a plurality of transparent display units configured to display virtual reality content, the plurality of transparent display units being mounted on front and side surfaces of the moving means;
    a dynamic motion sensing unit configured to detect a three-dimensional (3D) dynamic motion of the moving means;
    a control unit configured to control reproduction of previously stored virtual reality content so as to display virtual reality content corresponding to the 3D dynamic motion detected by the dynamic motion sensing unit on the plurality of transparent display units;
    a line-of-sight detector configured to detect a passenger's line of sight so as to target a content object; and
    a manipulation detector configured to detect a passenger's gesture for removing the content object targeted by the line-of-sight detector,
    wherein the control unit targets the content object located at a region corresponding to the passenger's line of sight when the passenger's line of sight is detected by the line-of-sight detector, and controls the targeted content object when the passenger's gesture is detected by the manipulation detector.

2. The apparatus of claim 1, wherein the control unit controls a background and an object of the virtual reality content when the 3D dynamic motion of the moving means is detected.

3. The apparatus of claim 1, wherein the dynamic motion sensing unit comprises a motion sensor configured to sense 3-axis acceleration, speed, and orientation of the moving means so as to control a background of the virtual reality content.

4. The apparatus of claim 1, wherein the dynamic motion sensing unit comprises an event sensor configured to sense a vibration or an impact applied to the moving means so as to control a content object of the virtual reality content.

5. The apparatus of claim 1, wherein
    the dynamic motion sensing unit comprises a global positioning system (GPS) device configured to sense latitude, longitude, and altitude of the moving means so as to sense location information of the moving means, and
    the control unit controls a background of the virtual reality content on the basis of the location information of the moving means detected by the GPS device.

6. A method of providing virtual reality content of a moving means, comprising:
    detecting a three-dimensional (3D) dynamic motion of the moving means by a dynamic motion sensing unit;
    controlling reproduction of virtual reality content displayed on a transparent display unit to correspond to the detected 3D dynamic motion of the moving means, the controlling of the reproduction of the virtual reality content being performed by a control unit;
    detecting a passenger's line of sight to allow a line-of-sight detector to target a content object;
    detecting the passenger's gesture to allow a manipulation detector to remove the content object targeted by the line-of-sight detector; and
    controlling the content object, which is targeted by the line-of-sight detector, by the control unit, when the content object is targeted by the line-of-sight detector and a passenger's gesture for removing the targeted content object is detected by the manipulation detector.

7. The method of claim 6, wherein the controlling of the reproduction of the virtual reality content comprises controlling a background and an object of the virtual reality content by the control unit, based on sensing information of the moving means.

8. The method of claim 6, wherein the detecting of the 3D dynamic motion of the moving means comprises sensing a vibration or an impact applied to the moving means to allow the control unit to control a content object of the virtual reality content.

9. The method of claim 6, wherein the detecting of the 3D dynamic motion of the moving means comprises sensing 3-axis acceleration, speed, and orientation of the moving means to allow the control unit to control a background of the virtual reality content.

10. The method of claim 6, wherein
    the detecting of the 3D dynamic motion of the moving means comprises sensing latitude, longitude, and altitude of the moving means to sense location information of the moving means using a global positioning system (GPS) device, and
    the controlling of the reproduction of the virtual reality content comprises controlling a background of the virtual reality content by the control unit, based on the location information of the moving means detected by the GPS device.

* * * * *